United States Patent [19]
Vos

[11] Patent Number: 6,098,488
[45] Date of Patent: Aug. 8, 2000

[54] ADJUSTABLE LEVERAGE BRAKE LEVER

[75] Inventor: Gavin Michael Vos, Elizabeth, South Africa

[73] Assignee: Muchachos International Co., Ltd., Taichung, Taiwan

[21] Appl. No.: 09/346,384

[22] Filed: Jul. 1, 1999

[51] Int. Cl.[7] .............................. B62K 23/06; B62L 3/02
[52] U.S. Cl. ............................................ 74/502.2; 74/489
[58] Field of Search ..................................... 74/489, 502.2

[56] References Cited

U.S. PATENT DOCUMENTS

| | | | |
|---|---|---|---|
| 5,448,927 | 9/1995 | Lumpkin ................................. | 74/502.2 |
| 5,660,082 | 8/1997 | Hsieh ..................................... | 74/502.2 |
| 5,819,589 | 10/1998 | Nakashima et al. ..................... | 74/489 |
| 5,910,193 | 6/1999 | Chen ................................... | 74/502.2 X |

FOREIGN PATENT DOCUMENTS

| | | | |
|---|---|---|---|
| 589293 | 2/1925 | France ................................... | 74/502.2 |

*Primary Examiner*—Mary Ann Battista
*Attorney, Agent, or Firm*—Charles E. Baxley

[57] ABSTRACT

A brake lever for a cycle includes a brake handle having a crank beam pivotally coupled to a lever bracket at a pivot shaft, an adjuster nut rotatably received in the brake handle and extended outward of the brake handle so as to be rotated by the user. A bar has one end pivotally coupled to the crank beam at a pivot pin and has a cable link pivotally coupled to the other end. A bolt is threaded through the adjuster nut and has one end pivotally coupled to the bar for rotating the bar about the pivot pin and for adjusting the brake lever to different brake leverages.

2 Claims, 2 Drawing Sheets

ADJUSTABLE LEVERAGE BRAKE LEVER

BACKGROUND OF THE INVENTION

1. Field of the Invention

The present invention relates to a brake lever, and more particularly to an adjustable leverage brake lever.

2. Description of the Prior Art

Typical brake levers comprise a complicated configuration that may not be easily adjusted to different leverage by the riders while riding the cycle.

The present invention has arisen to mitigate and/or obviate the afore-described disadvantages of the conventional brake levers.

SUMMARY OF THE INVENTION

The primary objective of the present invent ion is to provide an adjustable leverage brake lever which may be easily adjusted to different leverages by the riders while riding the cycle.

In accordance with one aspect of the invention, there is provided a brake lever for a cycle comprising a lever bracket, a brake handle including a crank beam pivotally coupled to the lever bracket at a pivot shaft and including a chamber formed therein, an adjuster nut rotatably received in the chamber of the brake handle and extended outward of the brake handle for allowing a user to rotate the adjuster nut, a bar including a first end pivotally coupled to the crank beam at a pivot pin and including a second end, a cable link including a first end pivotally coupled to the second end of the bar at a pivot axle and including a second end for coupling to a brake cable, and a bolt threaded through the adjuster nut and including a first end pivotally coupled to the bar. The first end of the bolt is allowed to be moved toward and away from the adjuster nut to rotate the bar about the pivot pin when the adjuster nut is rotated relative to the brake handle, for adjusting a relative position between the pivot axle and the pivot shaft and for adjusting the brake lever to different brake leverages.

The bar includes a middle portion having a slot formed therein, the first end of the bolt includes a projection pivotally engaged in the slot of the bar.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
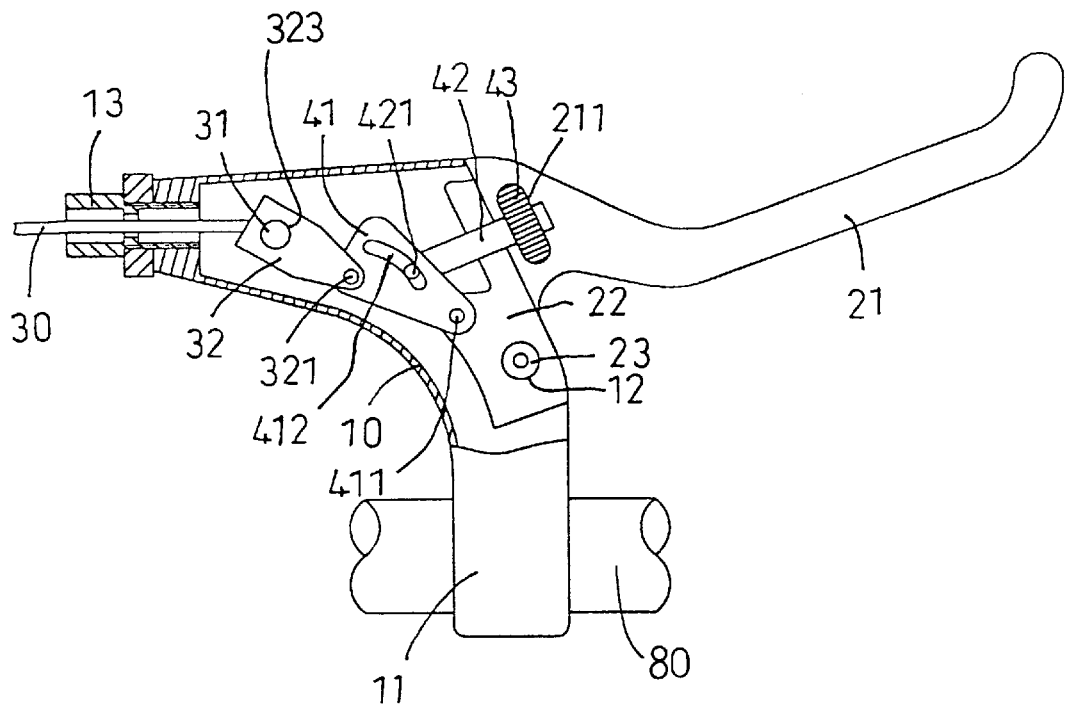
FIG. 1 is a plane view of a brake lever in accordance with the present invention, in which a portion of the lever bracket is removed for showing the inner structure of the brake lever.

Referring to the drawings, and initially to FIG. 1, an adjustable leverage brake lever in accordance with the present invention comprises a lever bracket 10 including a loop section 11 for attaching to a handle bar 80 of the bicycle and including a conventional cable adjuster 13 threaded thereto for receiving a cable 30 and for adjusting the tightness of the cable 30. A brake handle 21 includes a crank beam 22 provided in one end thereof and pivotally coupled to the lever bracket 10 at a pivot shaft 23 that is engaged through a hole 12 of the lever bracket 10. The brake handle 21 includes a chamber 211 formed close to the crank beam 22 for rotatably receiving an adjuster nut 43 therein. The adjuster nut 43 has one or two sides extended outward beyond the brake handle 21 for allowing the users to rotate the adjuster nut 43.

A bar 41 has one end pivotally coupled to the crank beam 22 at a pivot pin 411 and includes an aperture or a curved slot 412 formed in the middle portion thereof. A bolt 42 includes a projection 421 secured to one end thereof and extended through the curved slot 412 of the bar 41. The bolt 42 is engaged with the adjuster nut 43 which may move the projection 421 of the bolt 42 toward and away from the adjuster nut 43 by rotating the adjuster nut 43 relative to the bolt 42. A cable link 32 includes one end pivotally coupled to the other end of the bar 41 at a pivot axle 321 and includes an orifice 323 formed in the other end for receiving a cast lug barrel 31 of the cable 30. The slot 412 of the bar 41 may simply be an aperture for rotatably receiving the projection 421 of the bolt 42 instead of being a curved slot.

Figure 2:
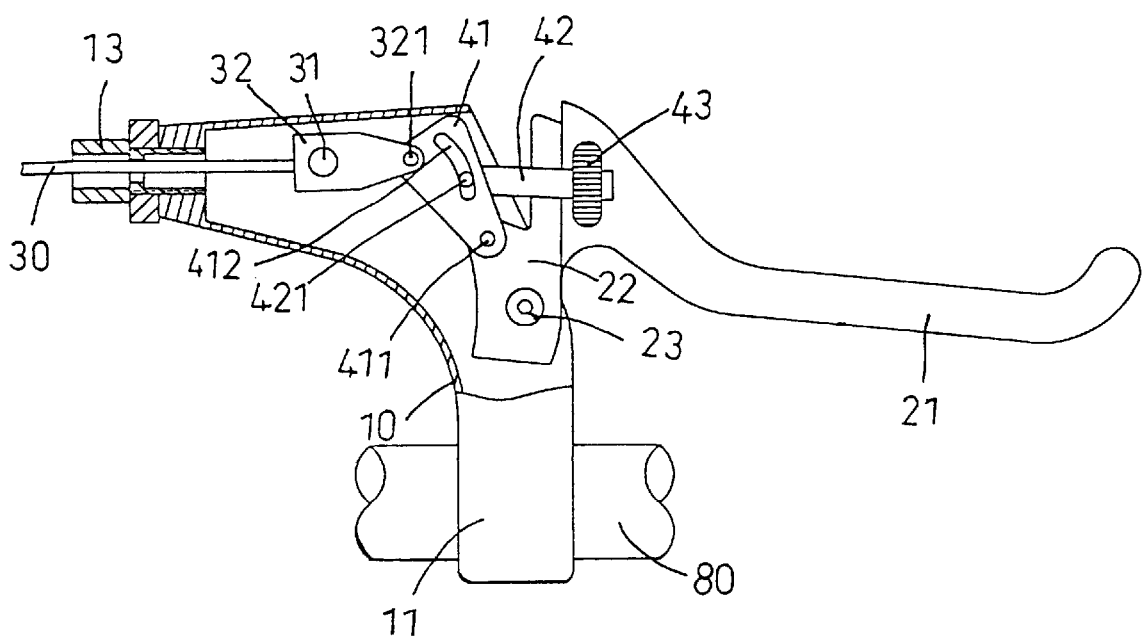
FIGS. 2, 3, 4 are plane views similar to FIG. 1, illustrating the operation of the brake lever.
Figure 3:
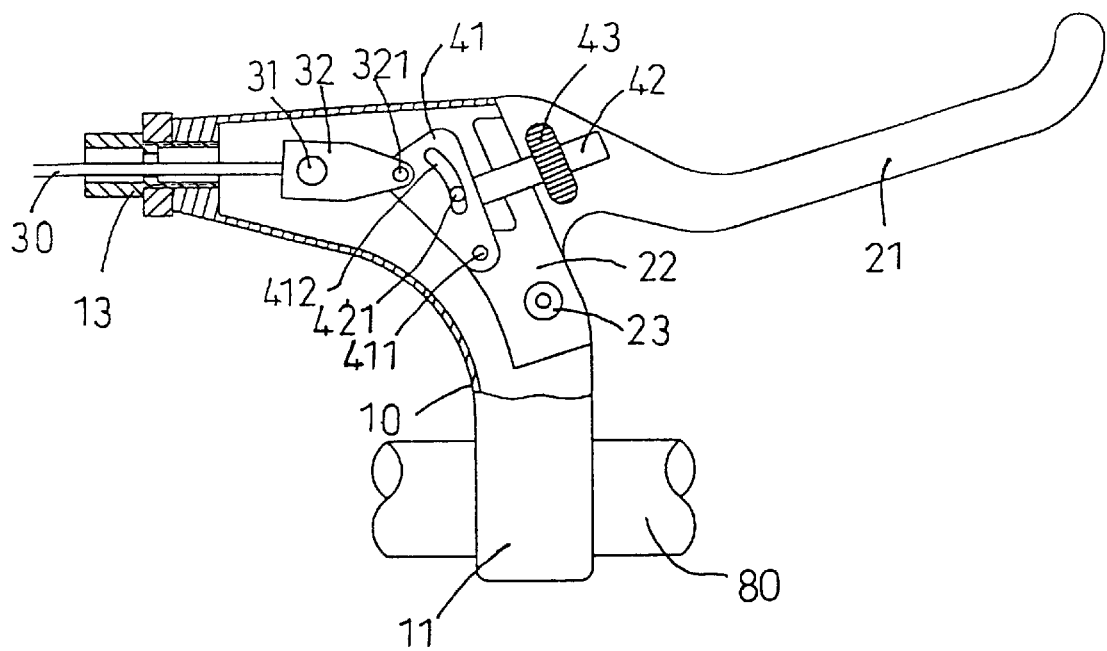
Figure 4:
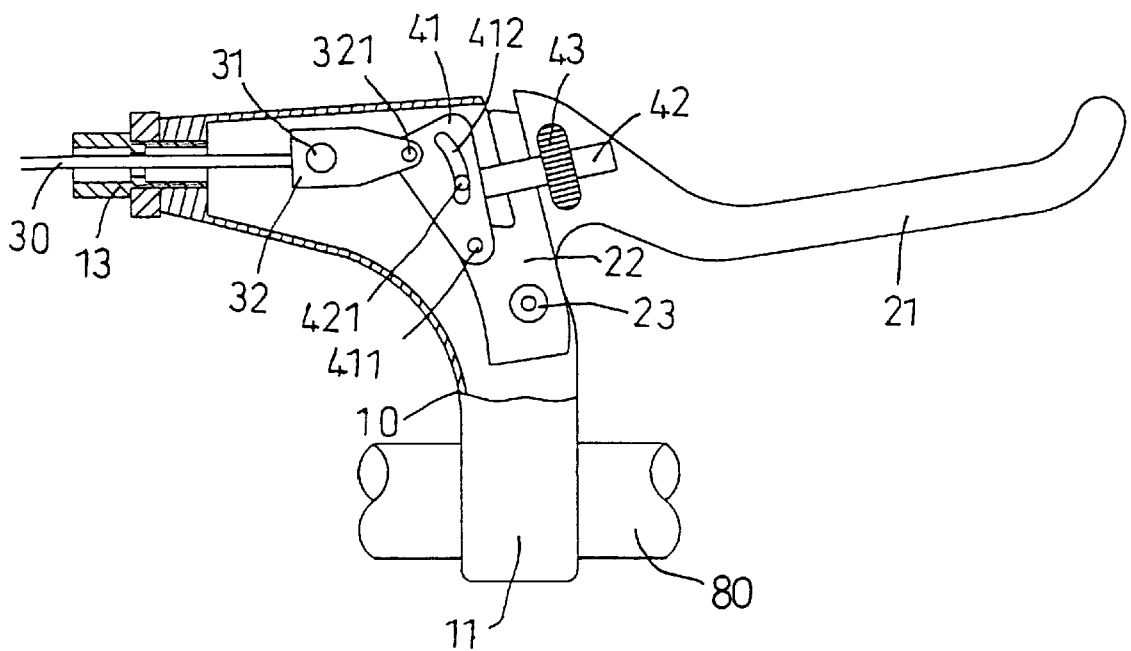

In operation, when the adjuster nut 43 is rotated relative to the brake handle 21 by the user, the projection 421 of the bolt 42 may be adjusted and moved toward or away from the adjuster nut 43 for adjusting the distance between the pivot axle 321 and the pivot shaft 23 or for rotating the bar 41 about the pivot pin 411. For example, as shown in FIGS. 1 and 2, when the projection 421 of the bolt 42 is adjusted and moved away from the adjuster nut 43, the pivot axle 321 may be adjusted away from the adjuster nut 43 and may be adjusted closer to the pivot shaft 23, for example, such that the brake handle 21 may apply a greater force against the cable 30 and such that the cable link 32 may be moved for a further distance. As shown in FIGS. 3 and 4, when the projection 421 of the bolt 42 is adjusted and moved toward the adjuster nut 43, the pivot axle 321 may be adjusted toward the adjuster nut 43 and may be adjusted slightly away from the pivot shaft 23, such that the brake handle 21 may apply a smaller force against the cable 30 and such that the cable link 32 may be moved for a shorter distance.

It is to be noted that the adjuster nut 43 may be easily rotated relative to the brake handle 21 when the riders are riding the cycle, in order to adjust to different leverages. The bolt 42 is engaged through the adjuster nut 43 which is rotatably received in the chamber 211 of the brake handle 21, such that the extending direction of the bolt 42 from the brake handle 21 is determined and such that the projection 421 of the bolt 42 may only be slided along the curved slot 412 for a small distance.

Accordingly, the adjustable leverage brake lever in accordance with the present invention may be easily adjusted to different leverages by the riders while riding the cycle.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A brake lever for a cycle comprising:

a lever bracket, a brake handle including a crank beam pivotally coupled to said lever bracket at a pivot shaft and including a chamber formed therein, an adjuster nut rotatably received in said chamber of said brake handle and extended outward of said brake handle for allowing a user to rotate said adjuster nut, a bar including a first end pivotally coupled to said crank beam at a pivot pin and including a second end, a cable link including a first end pivotally coupled to said second end of said bar at a pivot axle and including a second end for coupling to a brake cable, and a bolt threaded through said adjuster nut and including a first end pivotally coupled to said bar, said first end of said bolt being moved toward and away from said adjuster nut to rotate said bar about said pivot pint when said adjuster nut is rotated relative to said brake handle, for adjusting a relative position between said pivot axle and said pivot shaft.

2. The brake lever according to claim 1, wherein said bar includes a middle portion having a slot formed therein, said first end of said bolt includes a projection pivotally engaged in said slot of said bar.

* * * * *